United States Patent
Saitoh (10) Patent No.: US 8,910,845 B2
(45) Date of Patent: Dec. 16, 2014

(54) METHOD FOR CUTTING GLASS SHEET

(75) Inventor: Takayoshi Saitoh, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 294 days.

(21) Appl. No.: 13/580,152

(22) PCT Filed: May 24, 2011

(86) PCT No.: PCT/JP2011/061795
§ 371 (c)(1),
(2), (4) Date: Aug. 21, 2012

(87) PCT Pub. No.: WO2011/155314
PCT Pub. Date: Dec. 15, 2011

(65) Prior Publication Data
US 2012/0318838 A1 Dec. 20, 2012

(30) Foreign Application Priority Data
Jun. 7, 2010 (JP) ................. 2010-130145

(51) Int. Cl.
*B26F 3/00* (2006.01)

(52) U.S. Cl.
USPC ................... 225/2; 225/1; 225/96

(58) Field of Classification Search
USPC ................... 225/1, 2, 93, 94, 96
See application file for complete search history.

(56) References Cited

U.S. PATENT DOCUMENTS

| | | | | |
|---|---|---|---|---|
| 4,371,103 | A * | 2/1983 | Siemens et al. | 225/1 |
| 7,553,390 | B2 * | 6/2009 | Yamabuchi et al. | 156/257 |
| 8,110,777 | B2 * | 2/2012 | Zuehlke et al. | 219/121.68 |
| 8,220,685 | B1 * | 7/2012 | Lindsey et al. | 225/93 |
| 8,276,796 | B2 * | 10/2012 | Nishisaka et al. | 225/96.5 |
| 2005/0245051 | A1 | 11/2005 | Maekawa et al. | |
| 2005/0258135 | A1 | 11/2005 | Ishikawa et al. | |
| 2007/0158381 | A1 * | 7/2007 | Lisec | 225/2 |
| 2007/0228100 | A1 * | 10/2007 | Gonoe | 225/1 |
| 2013/0181026 | A1 * | 7/2013 | Su et al. | 225/103 |
| 2013/0240591 | A1 * | 9/2013 | Cox et al. | 225/2 |
| 2014/0239034 | A1 * | 8/2014 | Cleary et al. | 225/2 |

FOREIGN PATENT DOCUMENTS

| | | |
|---|---|---|
| CN | 1714055 A | 12/2005 |
| CN | 1321082 C | 6/2007 |
| JP | 09-141646 A | 6/1997 |
| JP | 09-278469 A | 10/1997 |

(Continued)

OTHER PUBLICATIONS

Official Communication issued in corresponding Chinese Patent Application No. 201180026923.9, mailed on Jul. 3, 2014.

(Continued)

*Primary Examiner* — Sean Michalski
(74) *Attorney, Agent, or Firm* — Keating & Bennett, LLP (57) ABSTRACT

Provided is a method for cutting a glass sheet whereby even a thin glass sheet having a thickness of 1 mm or less can be suitably cut. A nick (20a) is formed on a section of a planned cutting line (L) of a glass sheet (20). The glass sheet (20) is placed on a surface (10a) of a jig (10) in which an uneven portion (10b) having a shape corresponding to the planned cutting line (L) is formed. The glass sheet (20) is cut by deforming a portion thereof located above the uneven portion (10b) and developing a crack originating from the nick (20a).

15 Claims, 7 Drawing Sheets

(56) References Cited

FOREIGN PATENT DOCUMENTS

| | | |
|---|---|---|
| JP | 2001-002438 A | 1/2001 |
| JP | 2007-191352 A | 8/2007 |
| JP | 2008-019102 A | 1/2008 |
| JP | 2009-242184 A | 10/2009 |
| JP | 2011-026136 A | 2/2011 |
| WO | 03/082542 A1 | 10/2003 |

OTHER PUBLICATIONS

English translation of Official Communication issued in corresponding International Application PCT/JP2011/061795, mailed on Jan. 17, 2013.

Official Communication issued in International Patent Application No. PCT/JP2011/061795, mailed on Jun. 28, 2011.

* cited by examiner

METHOD FOR CUTTING GLASS SHEET

TECHNICAL FIELD

This invention relates to a method for cutting a glass sheet.

BACKGROUND ART

Various methods for cutting a glass sheet are conventionally known. For example, Patent Literature 1 below describes a method for cutting glass by forming a scribe line on a surface of a glass sheet along a planned cutting line and then breaking the glass sheet at the scribe line.

Also, for example, Patent Literature 2 below discloses a method for cutting a glass sheet by melting it by irradiation of laser beam along a planned cutting line.

CITATION LIST

Patent Literature

Patent Literature 1: JP-A 2008-19102
Patent Literature 2: JP-A 2009-242184

SUMMARY OF INVENTION

Technical Problem

The above method in which a scribe line is formed and the above cutting method using laser are suitable for cutting a glass sheet having a thickness above a certain degree but not suitable for cutting a thin glass sheet.

Specifically, the method for cutting a thin glass sheet by forming a scribe line throughout a planned cutting line on the thin glass sheet and breaking the glass sheet has a problem in that it is difficult to cut the thin glass sheet along the planned cutting line.

In the case of cutting a thin glass sheet using laser, the development of a crack due to thermal expansion of the glass sheet may not suitably progress and therefore the glass sheet may not be able to be suitably cut. In addition, the shape accuracy of the cut edge of the glass sheet may be degraded.

The present invention has been made in view of these points and an object thereof is to provide a method for cutting a glass sheet whereby even a thin glass sheet having a thickness of 1 mm or less, for example, can be suitably cut.

Solution to Problem

A glass sheet cutting method according to the present invention relates to a glass sheet cutting method for cutting a glass sheet along a planned cutting line. The term planned cutting line used herein means a line at which a worker for cutting a glass sheet plans to cut the glass sheet. Therefore, the planned cutting line is an imaginary line and may not clearly be shown on the glass sheet.

The glass sheet cutting method according to the present invention performs a nick formation step of forming a nick on a section of the planned cutting line of the glass sheet. The method also performs a placement step of placing the glass sheet on a surface of a jig, the surface in which an uneven portion having a shape corresponding to the planned cutting line is formed. The method also performs a cutting step of cutting the glass sheet by deforming a portion of the glass sheet located above the uneven portion and developing a crack originating from the nick.

In the glass sheet cutting method according to the present invention, there is no need to form a scribe line on and throughout the planned cutting line as described in Patent Literature 1. The cut end surface of the glass sheet is formed as a result of development of a crack originating from the nick formed on a section of the planned cutting line of the glass sheet. Therefore, in the glass sheet cutting method according to the present invention, a sharp cut end surface can be obtained even if a glass sheet to be cut is thin, and the production of glass powder due to scribing can be reduced.

Furthermore, in the present invention, since a crack is developed by deforming the glass sheet, the crack suitably develops even in a thin glass sheet, unlike the case where the glass sheet is cut using laser. Therefore, in the glass sheet cutting method of the present invention, even a thin glass sheet can be suitably cut. Specifically, in the glass sheet cutting method of the present invention, even a glass sheet having a thickness ranging from 5 μm to 1 mm, for example, can be suitably cut. In other words, in the present invention, the thickness of the glass sheet may be within the range of 5 μm to 1 mm.

In addition, in the present invention, regardless of the shape of the planned cutting line, the glass sheet can be suitably cut by changing the shape of the uneven portion formed in the surface of the jig. For example, the glass sheet can be cut at a planned cutting line at least a section of which is curved. Furthermore, for example, the glass sheet can be cut at a planned cutting line having a closed shape. Specifically, in the present invention, the planned cutting line may have any shape, such as an S-shape, a U-shape, an arcuate shape, a circular shape, an elliptical shape, an oval shape or a polygonal shape.

In the present invention, the nick formation step may be performed prior to the placement step or after the placement step. When the nick formation step is performed after the placement step, the nick formation step may be performed prior to the cutting step or after the portion of the glass sheet located above the uneven portion is deformed in the cutting step.

Although in the present invention a crack originating from the nick develops throughout the planned cutting line in the cutting step, the development of the crack may not necessarily occur only in the cutting step. For example, in the nick formation step, a minute crack may have been produced in the portion in which the nick is formed. Furthermore, the crack produced in the nick formation step may or may not reach the surface of the glass sheet opposite to the surface thereof in which the nick is formed.

In the cutting step, the nick may be formed in either of the surfaces of the glass sheet. More specifically, the nick may be formed in the surface which is to be deformed in a depressed shape in the cutting step and is thereby to be subjected to a compressive stress or may be formed in the surface which is to be deformed in a raised shape in the cutting step and is thereby to be subjected to a tensile stress. However, if the nick is formed in the surface which is to be deformed in a depressed shape in the cutting step and is thereby to be subjected to a compressive stress, a crack originating from the nick preferably has developed, prior to the cutting step, to the surface which is to be subjected to a tensile stress in the cutting step. In other words, the nick is preferably formed so that during the nick formation step a crack originating the nick develops to the surface which is to be subjected to a tensile stress in the cutting step.

In the present invention, in the nick formation step, the nick is preferably formed along the planned cutting line. Thus, the glass sheet can be cut along the planned cutting line with high accuracy.

In the present invention, prior to the cutting step a resin sheet is preferably caused to bond or adhere to the glass sheet. Thus, even if, for example, the glass sheet is fractured in the cutting step, glass pieces can be prevented from scattering. In addition, because the sagging of the glass sheet can be reduced, the glass sheet can be effectively prevented from being fractured.

The bonding or adhesion of the resin sheet to the glass sheet is preferably performed prior to the nick formation step. Thus, it can be effectively prevented that the glass sheet is fractured during the formation of the nick and a crack develops from the nick in an unintended direction.

Furthermore, it is preferred that the resin sheet be caused to bond or adhere to the glass sheet prior to the placement step and in the placement step the glass sheet be placed so that the resin sheet is located toward the jig. Thus, it can be prevented that the glass sheet makes contact with the jig and is thereby damaged. When the glass sheet is deformed by suction caused by pressure reduction, the intervention of the resin sheet between the jig and the glass sheet facilitates provision of high airtightness and enables suitable deformation of the glass sheet. Therefore, the glass sheet can be cut with higher accuracy.

The resin sheet may be caused to bond or adhere only to one side of the glass sheet but resin sheets are preferably caused to bond or adhere to both sides of the glass sheet. By causing resin sheets to bond or adhere to both sides of the glass sheet, it can be more effectively prevented that when the glass sheet is fractured, glass pieces scatter and it can be more effectively prevented that the glass sheet is fractured by sagging.

In the present invention, no particular limitation is placed on the method for deforming the portion of the glass sheet located above the uneven portion of the jig in the cutting step. For example, the portion of the glass sheet located above the uneven portion may be deformed by using a jig having a surface in which a recess having a shape corresponding to the planned cutting line is formed and reducing the pressure of the space in the recess. Alternatively, the portion of the glass sheet located above the uneven portion may be deformed, for example, by pressing the portion of the glass sheet located above the uneven portion using a press die having a surface in which an uneven portion having a shape corresponding to the uneven portion of the jig is formed.

The above method for deforming the glass sheet by pressure reduction is suitable when the glass sheet to be cut is thin. In this method, because a large stress is applied to a specific portion of the thin glass sheet, the glass sheet can be prevented from being damaged. In this method, however, if the glass sheet is thick, it is necessary to reduce the pressure in the recess to a greater extent in order to deform the glass sheet by pressure reduction. Therefore, there is a need for a strong pressure reducing mechanism. By contrast, in the method using a press die, the glass sheet can be suitably deformed even if it is thick and has high rigidity. Therefore, if the glass sheet is thick, the method using a press die is suitably applied.

Specifically, the method for deforming a glass sheet by pressure reduction is more suitable when the thickness of the glass sheet is 5 $\mu$m to 100 $\mu$m, both inclusive. On the other hand, the method for deforming a glass sheet using a press die is more suitable when the thickness of the glass sheet is 100 $\mu$m to 1 mm, both inclusive.

Although no particular limitation is placed on the width of the uneven portion held in the jig used in the present invention, the width is preferably within the range of 100 times to 400 times the thickness of the glass sheet. If the width of the uneven portion is too large, the glass sheet may not be able to be cut with high accuracy at the planned cutting line. On the other hand, if the width of the uneven portion is too small, the glass sheet may not be able to be suitably deformed and may be difficult to cut.

Advantageous Effects of Invention

The present invention can provide a method for cutting a glass sheet whereby even a thin glass sheet having a thickness of 1 mm or less, for example, can be suitably cut.

DESCRIPTION OF EMBODIMENTS

Hereinafter, a description will be given of a preferred embodiment in which the present invention has been implemented. The present invention, however, is not limited at all to the following embodiment.

Figure 1:
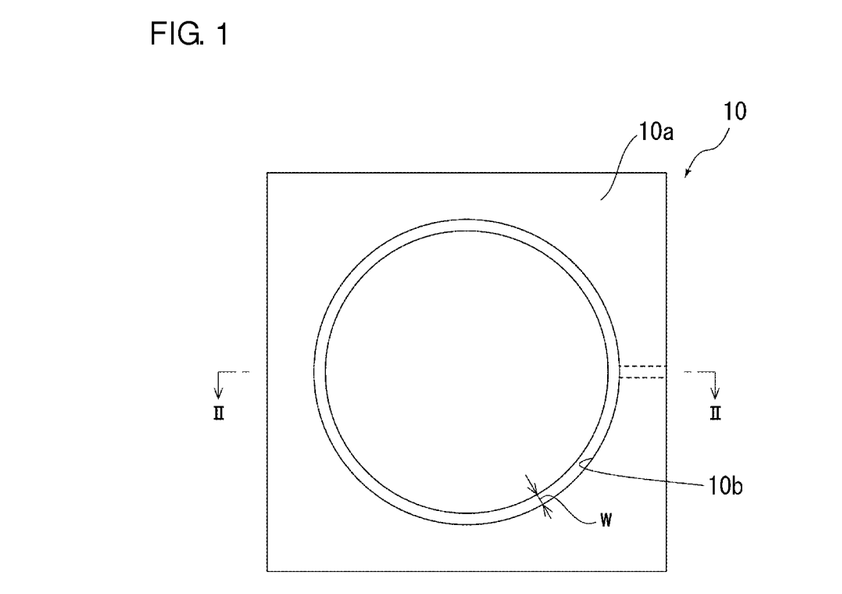
FIG. 1 is a schematic plan view of a jig used in a first embodiment of the present invention.
Figure 2:
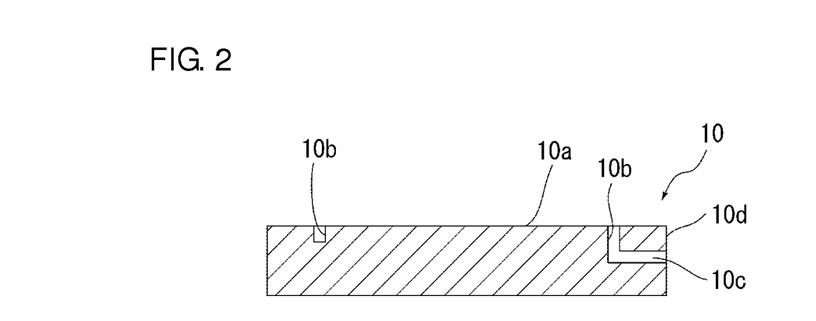
FIG. 2 is a schematic cross-sectional view taken along the line II-II in FIG. 1.

FIG. 1 is a schematic plan view of a jig used in this embodiment. FIG. 2 is a schematic cross-sectional view taken along the line II-II in FIG. 1.

First, a jig 10 used in this embodiment is described with reference to FIGS. 1 and 2.

As shown in FIGS. 1 and 2, the jig 10 is formed in the shape of a rectangular solid having a flat supporting surface 10a. An unevenness having a shape corresponding to the shape of a planned cutting line of a glass sheet is formed in the supporting surface 10a. Specifically, in this embodiment, a recess 10b having a shape corresponding to the shape of a planned cutting line of a glass sheet is formed in the supporting surface 10a. More specifically, in this embodiment, the planned cutting line is circular and, therefore, a circular recess 10b is formed. The width W of the recess 10b is preferably within the range of 100 times to 400 times the thickness of the glass sheet to be cut. Specifically, the width W of the recess 10b can be, for example, about 0.5 mm to about 10 mm. The depth of the recess 10b can be, for example, about 1 mm to about 10 mm.

As shown in FIG. 2, the recess 10b is connected to a communication hole 10c opening into a side surface 10d of the jig 10. The connection of this communication hole 10c to a pressure reducing mechanism, such as a pressure reducing pump, for example, allows the recess 10b to be reduced in pressure. No particular limitation is placed on the type of jig 10 so long as it has sufficiently high strength against a glass sheet to be cut. The jig 10 can be made from, for example, metal such as iron or aluminum; alloy such as stainless steel; or ceramics.

Figure 3:
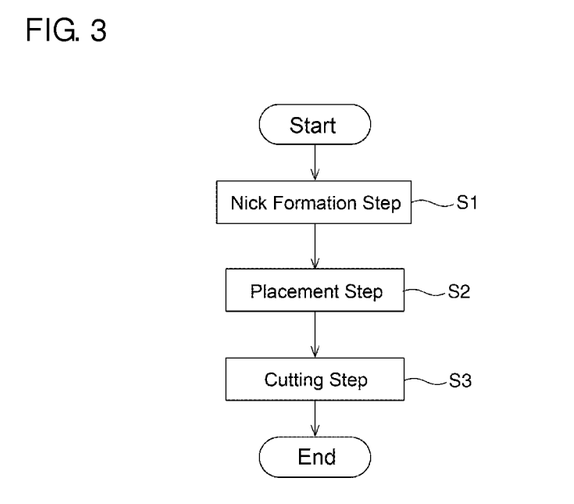
FIG. 3 is a flowchart representing a glass sheet cutting method in the first embodiment of the present invention.
Figure 4:
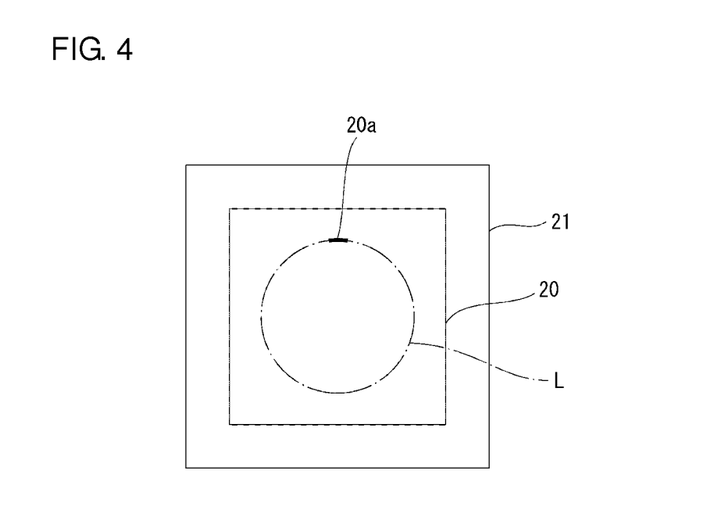
FIG. 4 is a schematic plan view for illustrating a nick formation step in the first embodiment of the present invention.
Figure 5:
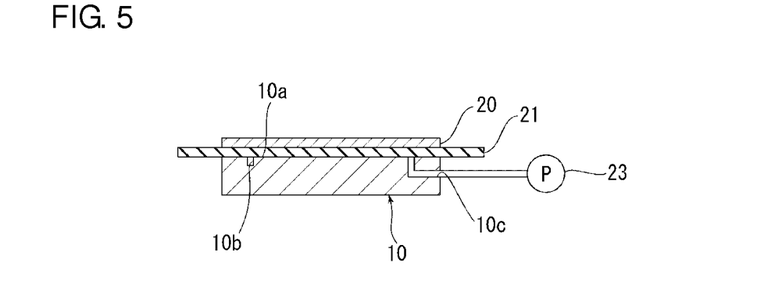
FIG. 5 is a schematic plan view for illustrating a placement step in the first embodiment of the present invention.
Figure 6:
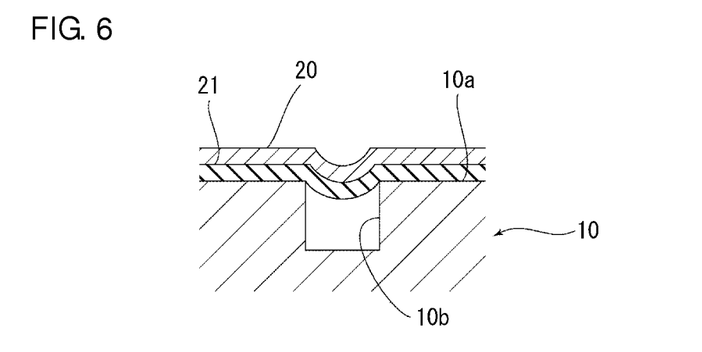
FIG. 6 is a schematic plan view for illustrating a cutting step in the first embodiment of the present invention.

FIG. 3 is a flowchart representing a glass sheet cutting method in this embodiment. FIG. 4 is a schematic plan view for illustrating a nick formation step in this embodiment. FIG. 5 is a schematic plan view for illustrating a placement step in this embodiment. FIG. 6 is a schematic plan view for illustrating a cutting step in this embodiment.

Next, mainly with reference to FIGS. 3 to 6, a description will be given of a glass sheet cutting method using the jig 10.

(Nick Formation Step)

First, as shown in FIG. 3, a nick formation step of forming a nick in a glass sheet is performed in Step S1. In the nick formation step in this embodiment, as shown in FIG. 4, a nick 20a is first formed in one surface of a glass sheet 20 to be cut. To be more specific, a nick 20a is formed on a section of a planned cutting line L of the glass sheet 20. In this embodiment, specifically, the nick 20a is formed along the planned cutting line L. No particular limitation is placed on the length of the nick 20a to be formed. However, if the nick 20a is too long, there may arise the same problem as in the case where a glass sheet is cut by forming a scribe line. Therefore, the length of the nick 20a is preferably 10 μm to 1 mm.

No particular limitation is placed on the method for forming the nick 20a. The nick 20a can be formed, for example, using a glass cutter or a laser.

In the nick formation step, the nick 20a may be formed so that a crack originating from the nick 20a develops in this step, but the nick 20a is preferably formed so that no crack originating from the nick 20a develops in this step.

Next, a resin sheet 21 having flexibility is caused to adhere or bond to the surface of the glass sheet 20 in which the nick 20a is formed. No particular limitation is placed on the method for causing the resin sheet 21 to adhere or bond to the glass sheet 20. For example, the resin sheet may be caused to adhere or bond to the glass sheet 20 using an adhesive or a bond or may be caused to adhere or bond to the glass sheet 20 using a double-sided adhesive tape or a double-sided bonding tape.

No particular limitation is placed on the type of the resin sheet 21 so long as it does not interfere with the deformation of the glass sheet 20. For example, a resin sheet 21 made of PET or polyester can be used. No particular limitation is placed on the thickness of the resin sheet 21. Specifically, the thickness of the resin sheet 21 can be, for example, about 50 μm to about 100 μm.

In this embodiment, the resin sheet 21 is greater in size than the glass sheet 20 and is caused to adhere or bond to the entire surface of the glass sheet 20. However, the resin sheet 21 is not necessarily provided in this manner. For example, no resin sheet 21 may be caused to adhere or bond to the glass sheet 20 or the resin sheet 21 may be caused to adhere or bond to the glass sheet 20 only around the planned cutting line L.

(Placement Step)

As shown in FIG. 3, following the nick formation step in Step S1, a placement step is performed in Step S2. Specifically, in this embodiment, as shown in FIG. 5, the glass sheet 20 to which the resin sheet 21 adheres or bonds is placed on the supporting surface 10a of the jig 10 with the resin sheet 21 facing the supporting surface 10a. In this placement step, the glass sheet 20 is placed so that the planned cutting line L on which the nick 20a is formed is located above the recess 10b. More specifically, the glass sheet 20 is placed so that the planned cutting line L on which the nick 20a is formed is located in the middle of the width of the recess 10b.

In the placement step, the adhesiveness between the resin sheet 21 and the jig 10 may be increased by placing a weight on the glass sheet 20.

Alternatively, the glass sheet 20 may be placed so that the surface of the glass sheet 20 opposite to the surface thereof in which the nick 20a is formed faces the supporting surface 10a. In this case, the nick 20a is preferably formed so that in the nick formation step a crack originating from the nick 20a has penetrated through the glass sheet 20 in the thickness direction.

(Cutting Step)

Next, as shown in FIG. 3, a cutting step is performed in Step S3. Specifically, a portion of the glass sheet 20 located above the recess 10b is deformed. More specifically, in this embodiment, the space in the recess 10b is reduced in pressure by actuating a suction mechanism 23 shown in FIG. 5. Thus, as shown in FIG. 6, the portion of the glass sheet 20 located above the recess 10b is deformed to rise toward the recess 10b. As a result, a stress along the normal direction of the supporting surface 10a is applied to the portion of the glass sheet 20 located above the recess 10b, so that a tensile stress is generated on the planned cutting line L of the glass sheet 20 on which the nick 20a is formed, a crack originating from the nick 20a thus develops on the planned cutting line L, and the glass sheet 20 is thereby cut.

In the cutting method of this embodiment, there is no need to form the nick 20a throughout the planned cutting line L of the glass sheet 20. The cut end surface of the glass sheet 20 is formed by the development of a crack originating from the nick 20a formed on a section of the planned cutting line L of the glass sheet 20. Therefore, even if the glass sheet 20 is thin, a sharp cut end surface can be obtained.

Furthermore, in this embodiment, since a crack originating from the nick 20a is developed by deforming the glass sheet 20, the development of the crack suitably progresses even if the glass sheet 20 is thin, unlike the case where a glass sheet is cut using laser. Therefore, even a thin glass sheet 20 can be suitably cut. Specifically, in the glass sheet cutting method of this embodiment, even a glass sheet 20 having a thickness ranging from 5 μm to 100 μm, for example, can be suitably cut.

In addition, in this embodiment, even if the planned cutting line L has any shape, the glass sheet 20 can be suitably cut by variously changing the shape of the recess 10b formed in the jig 10. Therefore, the glass sheet 20 can be cut along the circular planned cutting line L having a closed shape like this embodiment.

In this embodiment, since the nick 20a is formed along the planned cutting line L of the glass sheet 20, the glass sheet 20 can be cut along the planned cutting line L with higher accuracy.

In this embodiment, the glass sheet 20 is caused to adhere or bond to the resin sheet 21 and the resin sheet 21 is made close contact with the supporting surface 10a of jig 10. Thus, it can be prevented that the glass sheet 20 and the jig 10 are made direct contact with each other. Therefore, the glass sheet 20 is less likely to be damaged. Furthermore, since the adhesiveness between the glass sheet 20 and the jig 10 can be increased, the pressure reduction of the recess 10b can be suitably performed. Specifically, it can be effectively prevented that air enters the recess 10b through a gap between the glass sheet 20 and the jig 10. Therefore, stress can be uniformly applied to the portion of the glass sheet 20 located above the planned cutting line L. It can be prevented that a large stress is applied to part of the portion of the glass sheet 20 located above the planned cutting line L. Therefore, a crack originating from the nick 20a can be suitably developed. As a result, the glass sheet 20 can be cut with high accuracy. In this embodiment, since the width W of the recess 10b is within the range of 20 times to 100 times the thickness of the glass sheet to be cut, the glass sheet can be cut at the planned cutting line L with higher accuracy.

Although this embodiment has described an example in which after the nick formation step is performed, the resin sheet 21 is caused to bond or adhere to the glass sheet, the resin sheet 21 may be caused to bond or adhere to the glass sheet 20 before the nick formation step is performed. In this case, the glass sheet 20 can be prevented from being damaged during the formation of the nick 20a and, even in case of fracture of the glass sheet 20 during the formation of the nick 20a, produced glass pieces can be prevented from scattering.

Figure 7:
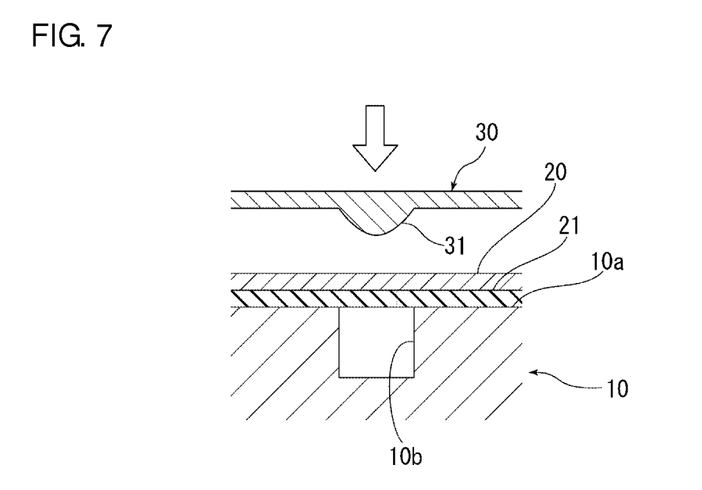
FIG. 7 is a schematic plan view for illustrating a cutting step in a first modification.

This embodiment has described an example in which the glass sheet 20 is deformed by reducing the pressure in the recess 10b. However, the method for deforming the glass sheet 20 is not limited to the above method. For example, as shown in FIG. 7, the portion of the glass sheet 20 located above the recess 10b may be deformed by pressing the portion of the glass sheet 20 located above the recess 10b using a press die 30 in which a raised portion 31 having a shape corresponding to the recess 10b is formed. This method is particularly effective when the thickness of the glass sheet 20 is within 100 μm to 1 mm.

Figure 8:
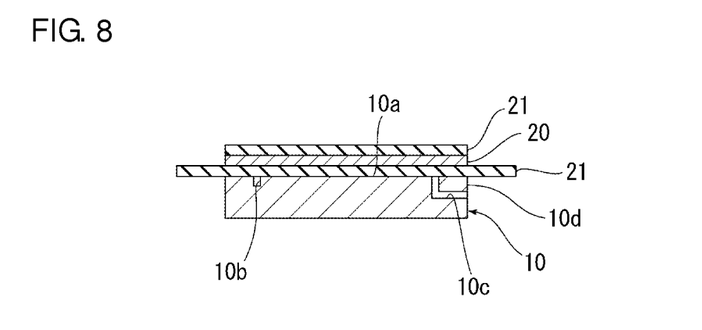
FIG. 8 is a schematic plan view for illustrating a placement step in a second modification.

Furthermore, this embodiment has described an example in which after the nick formation step the resin sheet 21 is caused to adhere or bond to the surface of the glass sheet 20 in which the nick 20a is formed. However, the present invention is not limited to this example. For example, no resin sheet 21 may be caused to adhere or bond to the glass sheet 20 or, as shown in FIG. 8, another resin sheet 21 may also be caused to adhere or bond to the surface of the glass sheet 20 opposite to the surface thereof in which the nick 20a is formed.

Figure 9:
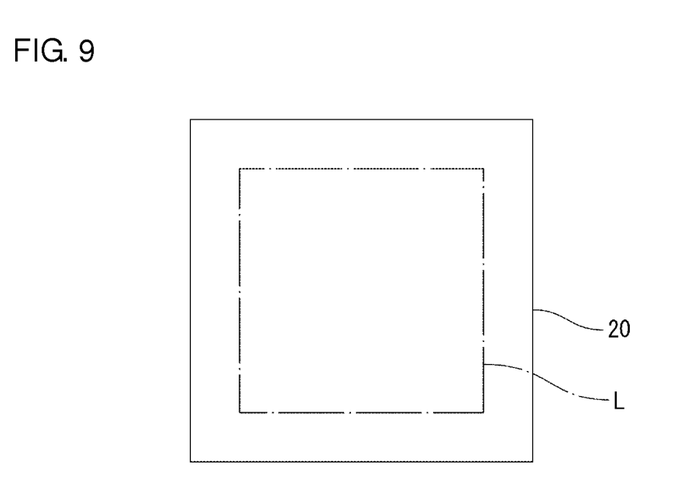
FIG. 9 is a schematic plan view of a glass sheet for illustrating the shape of a planned cutting line in a third modification.
Figure 10:
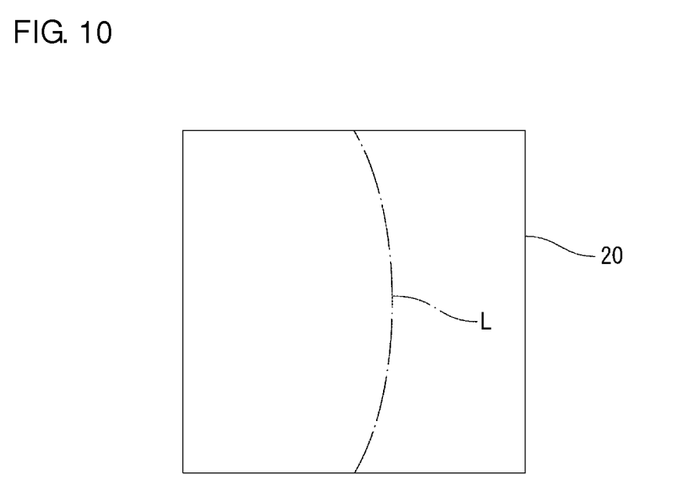
FIG. 10 is a schematic plan view of a glass sheet for illustrating the shape of a planned cutting line in a fourth modification.
Figure 11:
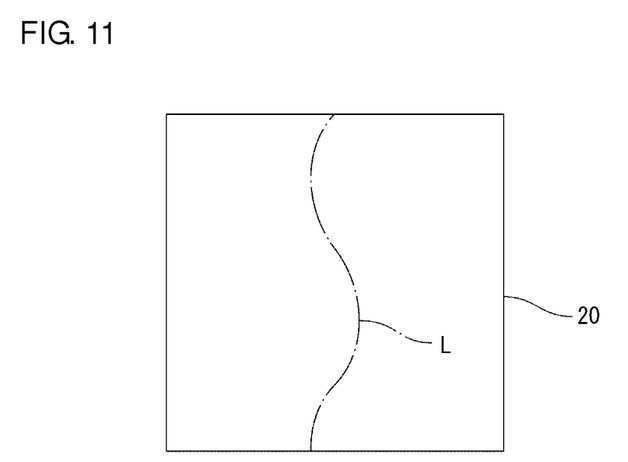
FIG. 11 is a schematic plan view of a glass sheet for illustrating the shape of a planned cutting line in a fifth modification.
Figure 12:
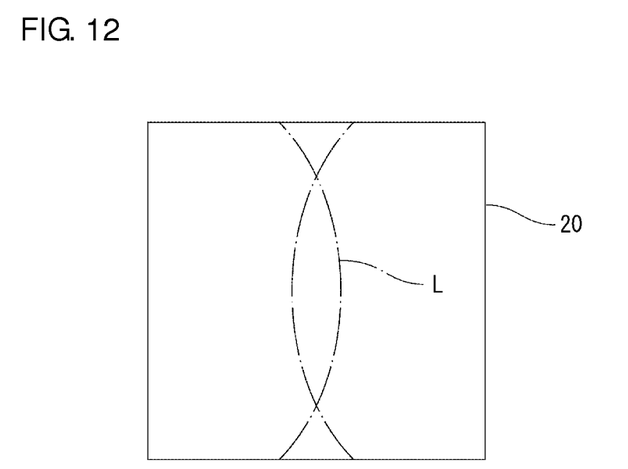
FIG. 12 is a schematic plan view of a glass sheet for illustrating the shape of a planned cutting line in a sixth modification.

The above embodiment has described an example in which the planned cutting line L is circular. In the present invention, however, no particular limitation is placed on the shape of the planned cutting line. For example, as shown in FIG. 9, the planned cutting line L may be rectangular. For example, as shown in FIG. 10, the planned cutting line L may be arcuate. For example, as shown in FIG. 11, the planned cutting line L may be meandering. Furthermore, the planned cutting line L may not be singular. For example, as shown in FIG. 12, the glass sheet 20 can be cut at two arcuate planned cutting lines L.

The above example has described an example in which the nick formation step is performed prior to the placement step. However, the present invention is not limited to this example. The nick formation step may be performed after the placement step. When the nick formation step is performed after the placement step, the nick formation step may be performed prior to the cutting step or after the glass sheet is deformed in the cutting step.

Other Embodiments

Figure 13:
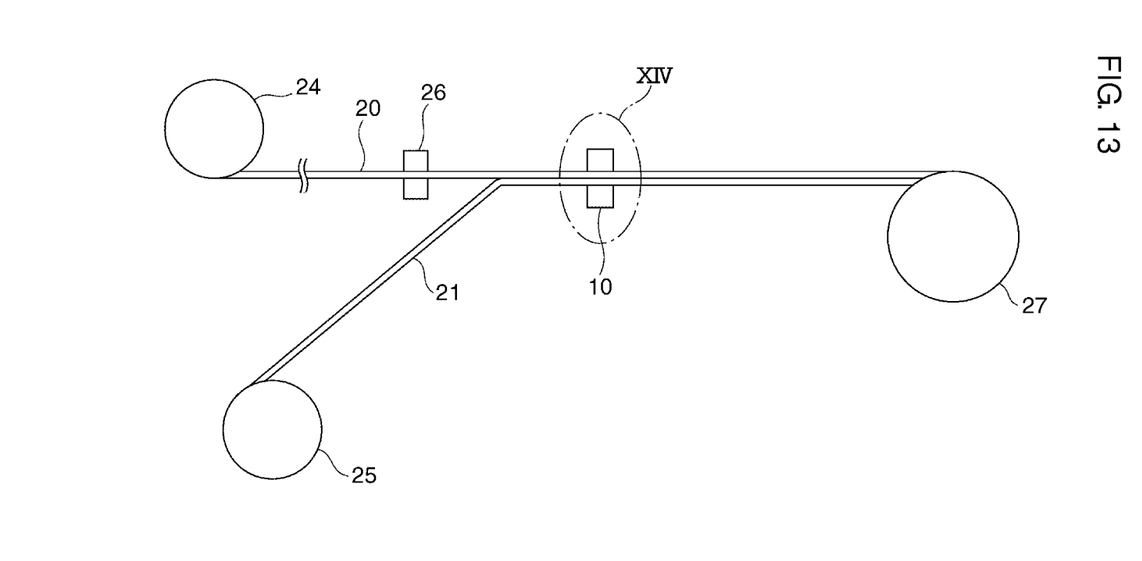
FIG. 13 is a schematic side view for illustrating a cutting step for a glass web in another embodiment of the present invention.
Figure 14:
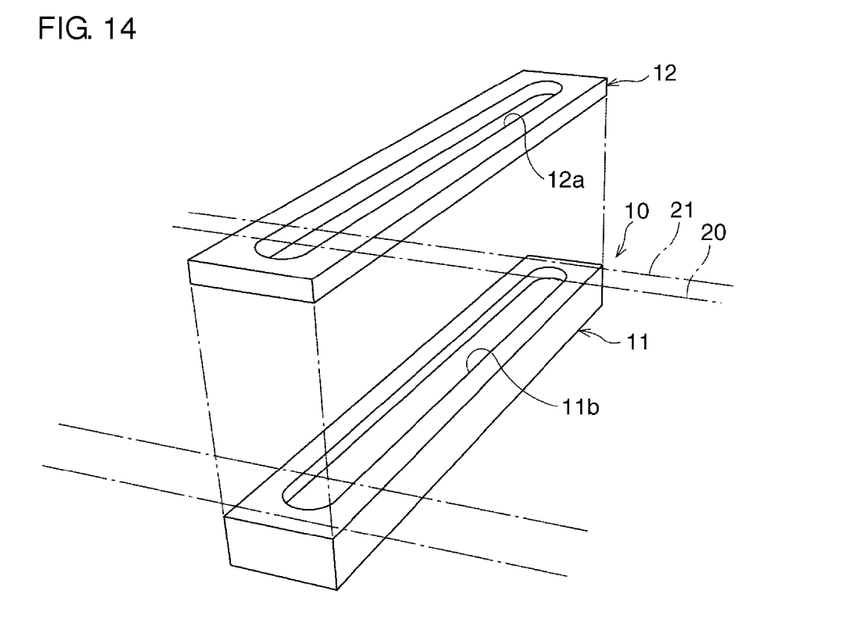
FIG. 14 is a schematic exploded perspective view in which a XIV portion of FIG. 13 is enlarged.
Figure 15:
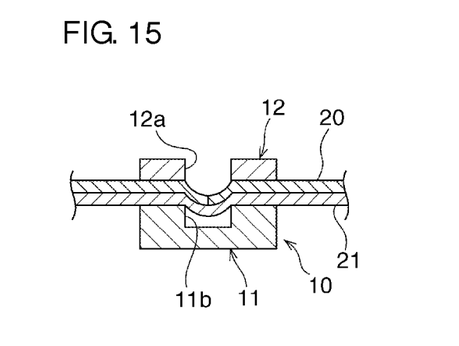
FIG. 15 is a schematic cross-sectional view in which the XIV portion of FIG. 13 is enlarged.

FIG. 13 is a schematic side view for illustrating a cutting step in another embodiment of the present invention. FIG. 14 is a schematic exploded perspective view in which a XIV portion of FIG. 13 is enlarged. FIG. 15 is a schematic cross-sectional view in which the XIV portion of FIG. 13 is enlarged.

This embodiment describes a method in which a web of glass is cut along the width direction at regular intervals of the length to successively produce a plurality of cut glass sheets. The method described by this embodiment is effective for cutting into glass sheets having a thickness of 200 μm or less, particularly glass sheets having a thickness of about 100 μm to about 5 μm.

First, as shown in FIG. 13, a glass web 20 is successively paid out of a roll 24 in which the glass web 20 is rolled up. Nicks are formed in the paid-out glass web 20 at regular intervals using a nick formation apparatus 26. A resin sheet 21 fed from a roll 25 is successively applied to the glass web 20 in which the nicks have been formed at regular intervals.

Thereafter, the glass web 20 is cut into sheets by developing cracks originating from the nicks with a jig 10. The cut glass sheets 20 are successively rolled up into a roll 27 together with the resin sheet 21 as they are attached to the resin sheet 21.

The formation of nicks and the cutting of the glass web 20 are preferably performed with the conveyance of the glass web stopped, because the structures of the nick formation apparatus 26 and the jig 10 can be simplified.

The jig 10 develops a crack under the same principle as the jig 10 described in the above embodiment. Specifically, as shown in FIGS. 14 and 15, the jig 10 includes: a jig body 11 having a recess 11b in the shape corresponding to the shape of a crack to be developed; and a holding plate 12 having a through hole 12a in the shape corresponding to the shape of the recess 11b. The recess 11b is reduced in pressure with the glass web 20 and the resin sheet 21 clamped by the holding plate 12 and the jig body 11. Thus, a crack originating from the nick is developed.

In the cutting method of this embodiment, the glass web can be successively cut, thereby efficiently producing a plurality of cut glass sheets. Furthermore, since the cut glass sheets are fixed to the resin sheet 21, the cut glass sheets are easy to handle.

In order to suitably develop a crack, it is necessary that the recess 11b should be reliably reduced in pressure and the entire width of the glass web 20 should be located within the recess 11b. Therefore, it is preferred that the width of the recess 11b be greater than the width of the glass web 20, the resin sheet 21 be greater than the width of the glass web 20, and the resin sheet 21 cover the entire recess 11b.

Figure 16:
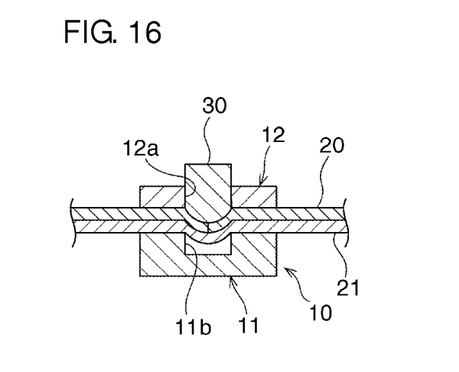
FIG. 16 is a schematic cross-sectional view of a cutting jig 10 for a glass sheet in a seventh modification.

Although this embodiment has described an example in which a crack is developed by reducing the pressure in the recess 11b, a crack may be developed by pressing with a press die 30 as shown in FIG. 16, instead of pressure reduction in the recess 11b or concurrently with pressure reduction in the recess 11b.

If the roll 24 is formed by rolling up a glass web 20 with a resin sheet applied to one principle surface of the glass web 20, the glass web 20 is preferably paid out of the roll 24 so that the other principle surface thereof to which the resin sheet is not applied faces the jib body 11. Furthermore, before the glass web 20 reaches the nick formation apparatus 26, the resin sheet may be peeled off from the glass web 20.

Although this embodiment has described an example in which the glass web 20 is fed from the roll 24, the glass web 20 may be fed directly from a molding apparatus for the glass web 20.

Although this embodiment has described an example in which the glass web 20 is cut linearly along the width direction, no particular limitation is placed on in what shape the glass web is to be cut in the present invention. For example, the glass web may be cut out in rectangular, circular, oval or other shapes.

REFERENCE SIGNS LIST

10 . . . jig
10a . . . supporting surface
10b . . . recess
10c . . . communication hole
10d . . . side surface
11 . . . jib body
11b . . . recess
12 . . . holding plate
12a . . . through hole
20 . . . glass sheet (web)
20a . . . nick
21 . . . resin sheet
23 . . . suction mechanism
30 . . . press die
31 . . . raised portion

The invention claimed is:

1. A glass sheet cutting method for cutting a glass sheet along a planned cutting line, the glass sheet cutting method comprising:
   a nick formation step of forming a nick on a section of the planned cutting line of the glass sheet;
   a placement step of placing the glass sheet on a surface of a jig, the surface in which an uneven portion having a shape corresponding to the planned cutting line is formed; and
   a cutting step of cutting the glass sheet by deforming a portion of the glass sheet located above the uneven portion and developing a crack originating from the nick.

2. The glass sheet cutting method according to claim 1, wherein prior to the cutting step a resin sheet is caused to bond or adhere to the glass sheet.

3. The glass sheet cutting method according to claim 2, wherein the bonding or adhesion of the resin sheet is performed prior to the nick formation step.

4. The glass sheet cutting method according to claim 2, wherein
   the bonding or adhesion of the resin sheet is performed prior to the placement step, and
   in the placement step the glass sheet is placed so that the resin sheet bonding or adhering to the glass sheet is located toward the jig.

5. The glass sheet cutting method according to claim 1, wherein a recess having a shape corresponding to the planned cutting line is formed in the surface of the jig, and in the cutting step the portion of the glass sheet located above the uneven portion is deformed by reducing the pressure of the space in the recess.

6. The glass sheet cutting method according to claim 1, wherein in the cutting step the portion of the glass sheet located above the uneven portion is deformed by pressing the portion of the glass sheet located above the uneven portion using a press die having a surface in which an uneven portion having a shape corresponding to the uneven portion of the jig is formed.

7. The glass sheet cutting method according to claim 1, wherein the nick formation step is performed prior to the placement step.

8. The glass sheet cutting method according to claim 1, wherein the nick formation step is performed after the placement step.

9. The glass sheet cutting method according to claim 8, wherein the nick formation step is performed prior to the cutting step.

10. The glass sheet cutting method according to claim 8, wherein the nick formation step is performed after the portion of the glass sheet located above the uneven portion is deformed in the cutting step.

11. The glass sheet cutting method according to claim 1, wherein at least a section of the planned cutting line is curved.

12. The glass sheet cutting method according to claim 1, wherein the planned cutting line has a closed shape.

13. The glass sheet cutting method according to claim 1, wherein the width of the uneven portion is within the range of 100 times to 400 times the thickness of the glass sheet.

14. The glass sheet cutting method according to claim 1, wherein the thickness of the glass sheet is within the range of 5 to 1 mm.

15. The glass sheet cutting method according to claim 1, wherein in the nick formation step the nick is formed along the planned cutting line.

* * * * *